US 7,703,782 B2

(12) United States Patent
Kiselis et al.

(10) Patent No.: US 7,703,782 B2
(45) Date of Patent: Apr. 27, 2010

(54) CONTROL ARM AND KNUCKLE ASSEMBLY

(75) Inventors: Gregory P. Kiselis, Oak Ridge, NC (US); Dalip K. Matharoo, Orion, MI (US); Timothy W. Skszek, Saline, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 11/990,415

(22) PCT Filed: Jul. 17, 2006

(86) PCT No.: PCT/CA2006/001139

§ 371 (c)(1),
(2), (4) Date: Oct. 2, 2008

(87) PCT Pub. No.: WO2007/009219

PCT Pub. Date: Jan. 25, 2007

(65) Prior Publication Data

US 2009/0134594 A1 May 28, 2009

Related U.S. Application Data

(60) Provisional application No. 60/699,897, filed on Jul. 18, 2005.

(51) Int. Cl.
*B60G 7/00* (2006.01)
*B60G 3/12* (2006.01)
(52) U.S. Cl. .......................... 280/124.133; 280/93.511; 280/93.512; 280/124.134
(58) Field of Classification Search ............ 280/93.511, 280/93.512, 124.133, 124.134
See application file for complete search history.

(56) References Cited

U.S. PATENT DOCUMENTS

| 2,305,705 | A |   | 12/1942 | Schieferstein |
|---|---|---|---|---|
| 3,650,552 | A |   | 3/1972 | Schmid |
| 3,740,986 | A |   | 6/1973 | Schmid |
| 4,720,120 | A | * | 1/1988 | Shimatani et al. ..... 280/124.109 |
| 4,738,458 | A |   | 4/1988 | Warner |
| 5,094,474 | A | * | 3/1992 | Ando et al. ........... 280/124.134 |
| 5,362,090 | A | * | 11/1994 | Takeuchi ............. 280/124.152 |
| 5,381,849 | A |   | 1/1995 | Fussnegger et al. |
| 5,556,119 | A |   | 9/1996 | Buchner et al. |
| 5,662,349 | A | * | 9/1997 | Hasshi et al. ......... 280/124.134 |
| 6,070,445 | A |   | 6/2000 | Holierhoek |
| 6,098,437 | A |   | 8/2000 | Kocer et al. |

(Continued)

FOREIGN PATENT DOCUMENTS

DE 19519303 A1 5/1995

(Continued)

*Primary Examiner*—Toan C To
(74) *Attorney, Agent, or Firm*—Harness, Dickey & Pierce PLC

(57) ABSTRACT

An assembly including a control arm and a steering knuckle, one of the control arm and the steering knuckle having a first end with a ball, the other of the control arm and the steering knuckle having a socket that includes a bearing structure formed so as to surround a portion of the ball to securely fasten the ball to the socket. The control arm has a bayonette configuration to receive a first node and a second node is cast directly onto the control arm.

24 Claims, 9 Drawing Sheets

U.S. PATENT DOCUMENTS

| | | |
|---|---|---|
| 6,216,763 B1 | 4/2001 | Ruehl et al. |
| 6,231,062 B1 * | 5/2001 | Sutton ................. 280/124.146 |
| 6,308,970 B1 | 10/2001 | Stuart |
| 6,308,972 B1 * | 10/2001 | Kincad et al. ......... 280/124.107 |
| 6,311,996 B1 | 11/2001 | Kato et al. |
| 6,572,126 B2 | 6/2003 | Tunzini |
| 6,705,627 B2 | 3/2004 | Hasebe et al. |
| 2004/0091306 A1 | 5/2004 | Wasylewski et al. |
| 2006/0151970 A1 | 7/2006 | Kaminski et al. |
| 2006/0290088 A1 * | 12/2006 | Luttinen et al. .......... 280/93.51 |
| 2009/0066049 A1 * | 3/2009 | Kunert et al. ......... 280/124.134 |

FOREIGN PATENT DOCUMENTS

| | | |
|---|---|---|
| DE | 19843825 A1 | 9/1998 |
| DE | 19961678 A1 | 12/1999 |
| DE | 10257221 A1 | 12/2002 |
| EP | 0546609 A1 | 6/1993 |
| EP | 1065077 A1 | 5/2000 |
| GB | 921908 | 11/1961 |
| JP | 7119729AA | 10/1993 |
| JP | 2003320829 | 11/2003 |
| WO | 2003/101767 A1 | 12/2003 |
| WO | WO 2003/101767 | 12/2003 |
| WO | PCT/CA2006/000820 | 11/2006 |

* cited by examiner

CONTROL ARM AND KNUCKLE ASSEMBLY

CROSS-REFERENCE TO RELATED APPLICATIONS

This application is a 371 National Stage of International application No. PCT/CA2006/001139, filed Jul. 17, 2006 and published in English as WO 2007/009219 A1 on Jan. 25, 2007. This application claims the benefit of U.S. Provisional Application Ser. No. 60/699,897, filed Jul. 18, 2005. The disclosures of the above applications are incorporated herein by reference.

FIELD OF THE INVENTION

The present invention relates to a coupling assembly. The present application illustrates embodiments of the present invention, including embodiments relating to automotive couplers, such as control arm/steering knuckle assemblies for motor vehicles.

BACKGROUND OF THE INVENTION

Control arms are used in motor vehicles to assist with supporting and controlling the respective wheels of the motor vehicle. Typically, control arms can be found connected between the frame of the motor vehicle and a wheel assembly, particularly between the frame and a steering knuckle. Control arm construction is generally complicated for a number of reasons including, for example, the number and nature of the connections between the control arm and other vehicle components and also because of the performance demands and stresses placed on control arms.

Control arms have been formed by joining a pair of stamped steel pieces together or by hydroforming as disclosed in WO 03/101767 for an Hydroformed Control Arm. Other examples of known control arms are disclosed in U.S. Pat. Nos. 6,070,445 to Holierhock; and 6,098,437 to Kocer et al.

Prior art control arms tend to be bulky due to the high performance demands and stresses. The bulkiness limits the turning radius capabilities of the vehicle steering.

The steering knuckle operably engages the control arm through a ball joint. The ball joint involves a separate element attached to both the control arm and to steering knuckle. Prior art ball joints utilized with steering mechanisms are disclosed in U.S. Pat. Nos. 5,556,119 to Buchner et al. and 6,308,970 to Stuart.

U.S. Patent Application Publication No. 2004/0091306 to Wasylewski et al. discloses a snap fit coupler for ball joint connecting a stabilizer bar to the vehicle.

SUMMARY OF THE INVENTION

The disadvantages of the prior art may be overcome by providing a compact control arm with an integrated node.

One aspect of the invention relates to a control arm assembly comprising a tubular steel body having a first end arcuately extending to a second end. The first end has a first node configured for mounting the first end for rotation about a first axis. The body has a second node affixed thereto intermediate the first and second ends. The second node is configured for mounting the control arm for rotation about the first axis. The first end has a bayonette configuration receiving a bushing assembly and a fastener retains said bushing assembly.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DESCRIPTION OF ILLUSTRATED EMBODIMENTS

Figure 1:
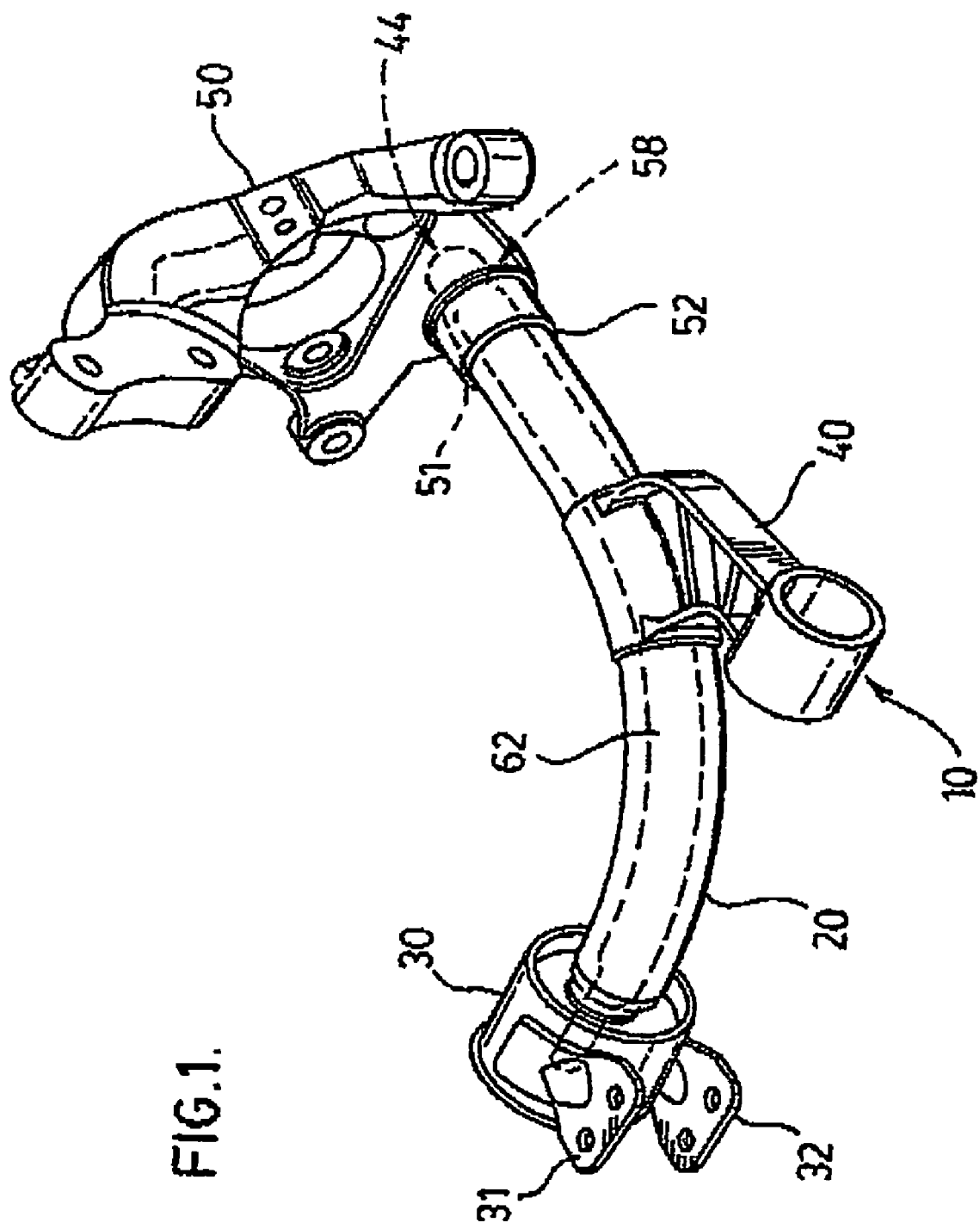
FIG. 1 illustrates a perspective view of a control arm and steering knuckle assembly of a vehicle suspension apparatus in accordance to one illustrated embodiment of the present invention.
Figure 2:
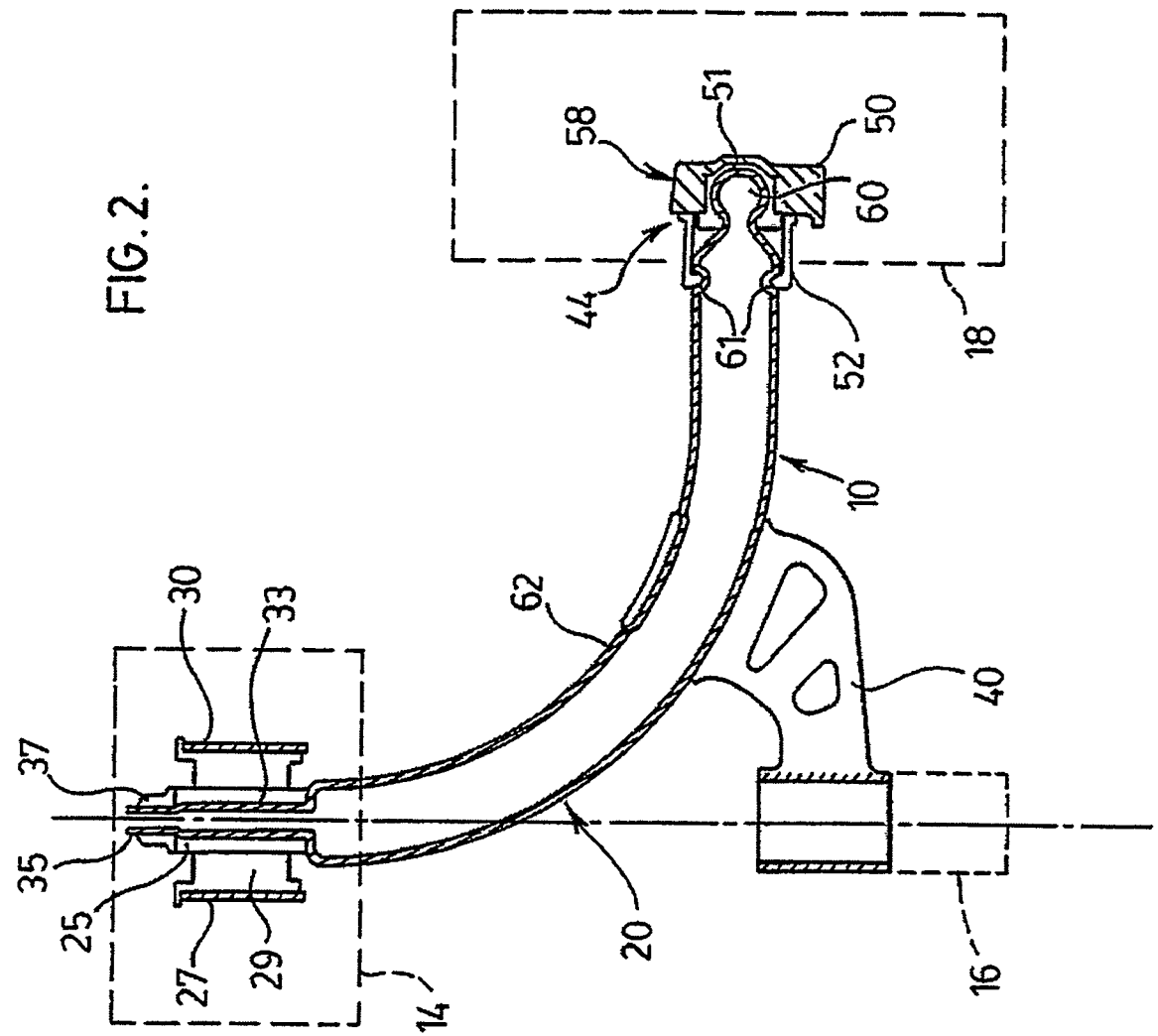
FIG. 2 illustrates a cross-section view of the assembly illustrated in FIG. 1.

FIGS. 1-5 illustrate a control arm assembly 10 operatively engaging a steering knuckle 50. The control arm assembly includes a control arm 20, a first connection node 30, and a second connection node 40. As generally known in the art, the control arm 20 has three engagement points with connection nodes 30 and 40 of the control arm assembly 10 adapted to be pivotally connected to portions 14 and 16 of a vehicle chassis and/or other vehicle suspension elements, and a third point for rotary connection comprising a end fitting 60 engaging the steering knuckle 50 in a ball and socket joint connecting to a vehicle wheel 18 and/or other vehicle suspension or steering elements.

The control arm 20 has a tubular steel body 62 having connection node 30 at a first end and an end fitting 60 at an opposite distal end. Connection node 40 is affixed to the control arm 20 intermediate the first end and the opposite distal end. The connection node 30 defines an axis of rotation of the control arm 20. The connection node 40 also defines an axis of rotation that is coincident with the axis of rotation of the connection node 30.

The control arm 20 is preferably arcuate in shape where the first end extends along the axis of rotation of the connection node 30 and bends approximately 90° so that the opposite distal end extends substantially normal to the axis of rotation.

The first end of the control arm 20 has a first reduced diameter portion 33 and a second reduced diameter portion 35. The first portion provides a bearing surface that receives connection node 30. The exterior surface of portion 35 is threaded and receives fastener 37. The first end provides a bayonette style mount for the node 30. Preferably, the first portion 33 and second portion 35 are rotary swaged to build wall thickness.

The first connection node 30 includes bushing assembly comprising a bushing 29, extending between an outer sleeve 27 and an inner sleeve 25. A first bracket 31 and a second bracket 32 are mounted on the sleeve 27 and configured for connecting the control arm 20 to a first portion 14 of, for example, a vehicle chassis. Fastener 37 retains the node 30 on the control arm 20.

Figure 7:
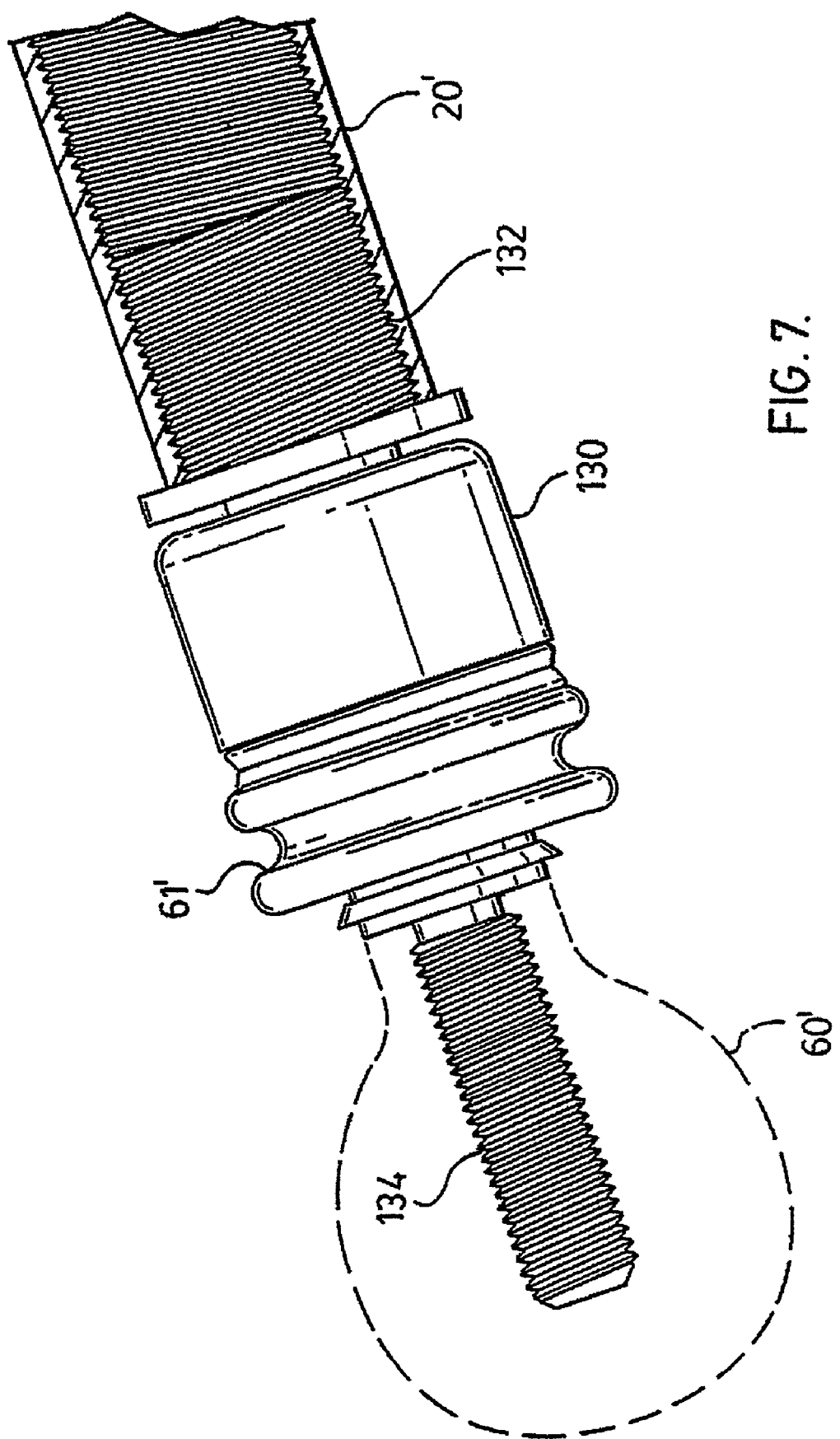
FIG. 7 illustrates a perspective view of an alternate embodiment of the connection for a control arm of the present invention.

The end fitting 60 is, in a first embodiment, a substantially spherical ball connected to the body 62 by a neck 90. Preferably, the body 62 and the end fitting 60 are integrally formed as a one-piece unitary construction. However, as illustrated in FIG. 7, the main portion 130 could be provided with a screw portion 134 and the end fitting 60' is threaded to main portion 130, which in turn is threaded into the end of the tube 20'.

The control arm 20 may be formed from any appropriate tubular high strength steel, preferably high strength spring steel having a yield strength of at least 760 MPa. The control arm 20 may be formed by rotary swaging or hydroforming as disclosed in WO 03/101767 for a Hydroformed Control Arm.

It is noted that the embodiments disclosed herein may be applied to a variety of control arm assemblies of different shapes and of different types of joints from that shown herein.

As illustrated, the connection node 40 is rigidly attached to control arm 20. The connection node 40 receives a bushing 41 within a tubular sleeve 43. Sleeve 43 integrally extends from a webbed arm 45 that extends from a mounting sleeve 47. Preferably, connection node 40 is cast in aluminum, or magnesium or other appropriate material directly on the control arm 20. The preferred method of casting is disclosed in PCT application no. CA 06/000820, filed May 19, 2006, entitled Controlled Pressure Casting. Some other methods of casting are disclosed in U.S. Pat. Nos. 5,381,849 to Fussnegger and 6,216,763 to Ruehl et al.

The second connection node 40 pivotally secures the control arm 20 to a second portion 16 of, for example, a vehicle chassis. The connection nodes 30 and 40 may also pivotally couple the control arm 20 to other elements, for example, vehicle suspension elements.

Figure 3:
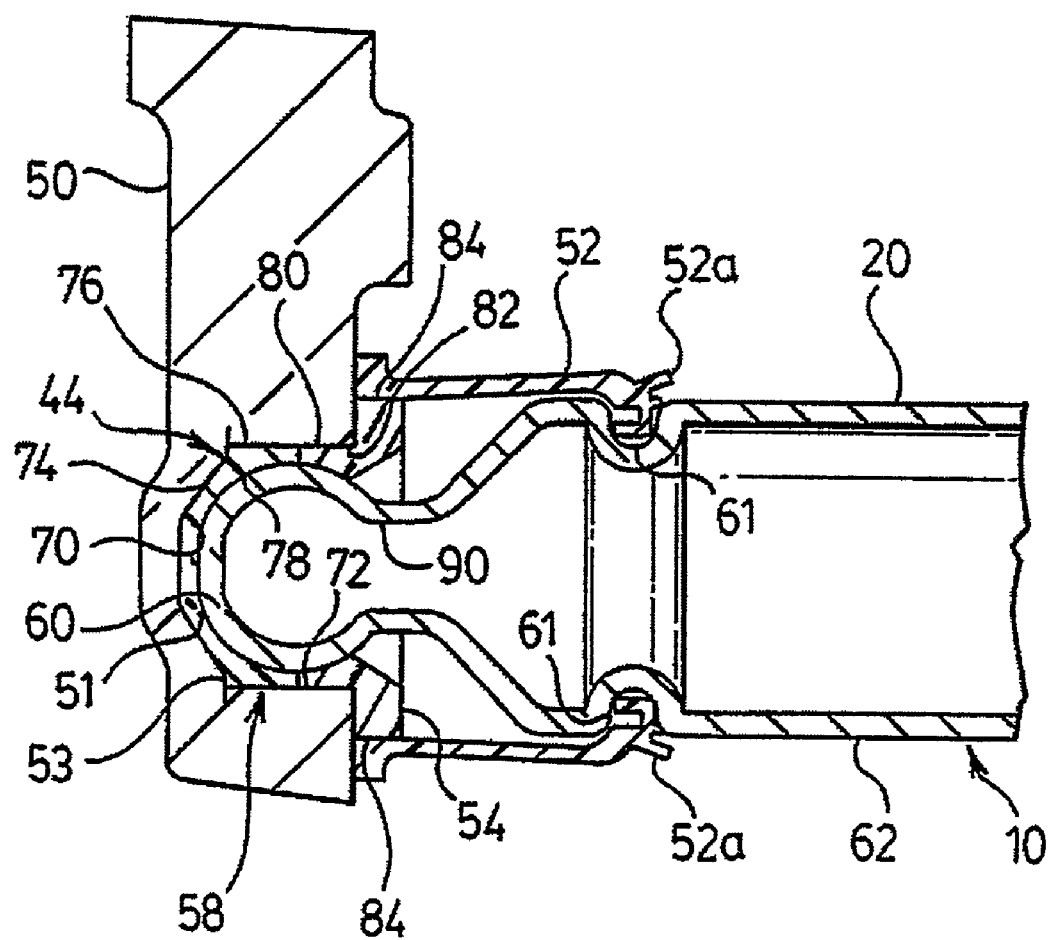
FIG. 3 illustrates a partial, cross-sectional view of the ball joint connection of the assembly in FIG. 1.
Figure 4:
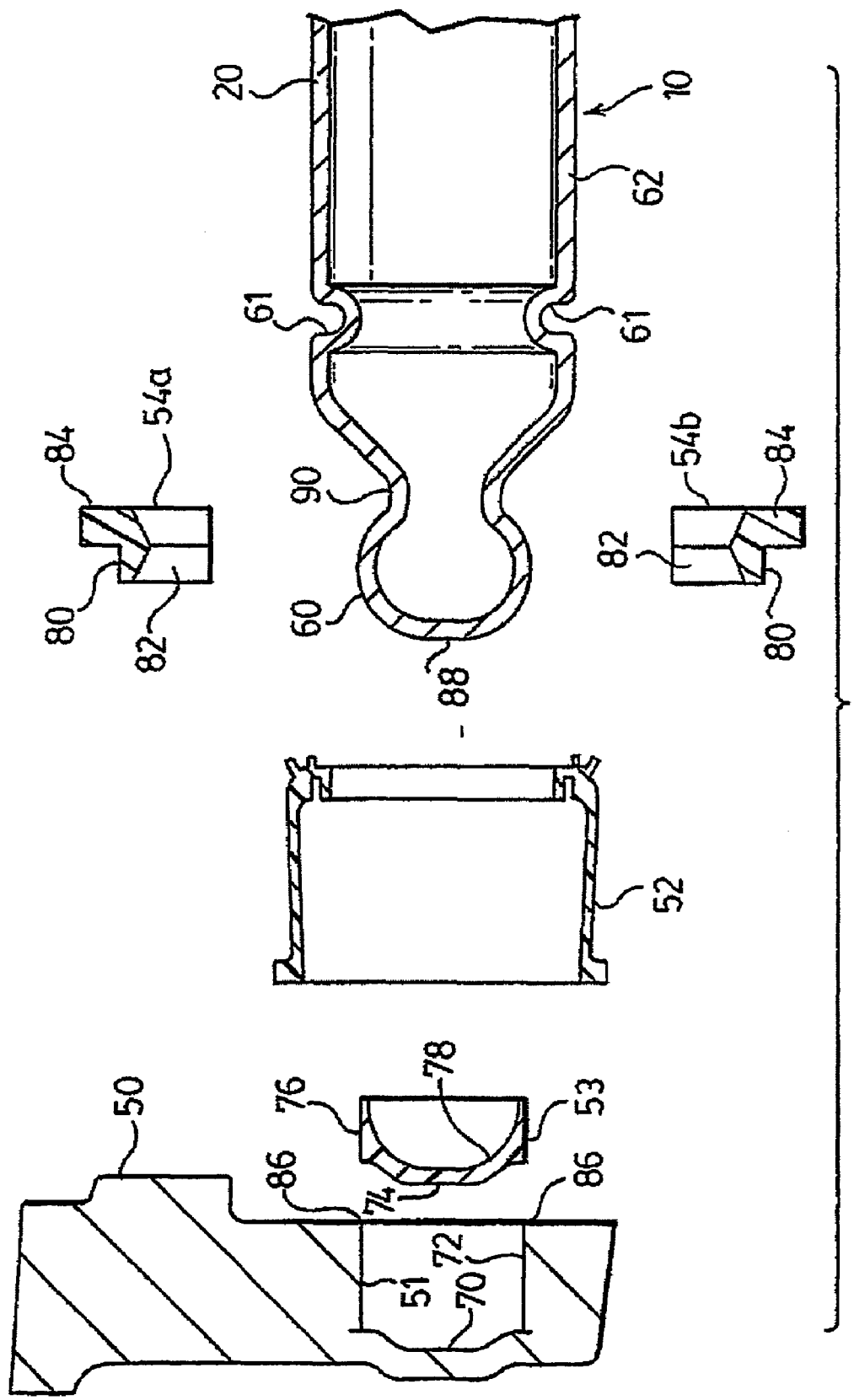
FIG. 4 illustrates an, exploded cross-sectional view of the assembly of FIG. 3.

As best seen in FIGS. 3 and 4, the steering knuckle 50 includes a complimentary fitting for end fitting 60, comprising a circular cavity or recessed socket 51 that forms a hollowed-out portion of the steering knuckle 50. The socket 51 may be formed in a variety of ways, including being integrally formed during the creation of the knuckle or formed as a post-manufacturing process, such as by boring or other methods. The socket 51 has a bottom 70 and a side wall 72 and is sized to receive the bearing 44.

Bearing 44 has an outer configuration to be positioned within the recess forming the socket 51 of the knuckle 50 and an inner configuration to provide a bearing surface for the end fitting 60 of the control arm 20 when the end fitting 60 is positioned within the socket 51. The bearing 44 and the socket 51 form the socket part of a ball-and-socket joint 58 between the control arm 20 and the knuckle 50 with the end fitting 60 of the control arm 20 forming the ball part of the joint 58.

Although the bearing 44 within socket 51 may be formed in various ways and take various configurations, one embodiment of the bearing 44 is illustrated in FIGS. 1-5 as a multi-piece bearing having an inner bearing member 53 and an outer bearing member 54. Inner bearing member 53 may be, for example, molded from an organic plastic, such as NYLON, and then secured into socket 51 with a press fit Adhesives or other fastening mechanisms may also be employed together or in combination to secure the entire bearing 44 in socket 51. Preferably, the shape and configuration of the top 74 and side 76 of bearing member 53 conforms to the shape and configuration as the bottom 70 and side 72 of socket 51, respectively. Inner surface 78 of inner bearing 53 is preferably spherically shaped in a concave manner to have substantially the same shape and configuration as end fitting 60 so that end fitting 60 can move smoothly within socket 51 against inner surface 78.

In one illustrated mode of construction, after end fitting 60 is inserted into socket 51, the outer bearing 54 is secured into socket 51 to secure end fitting 60 into socket 51.

Figure 5:
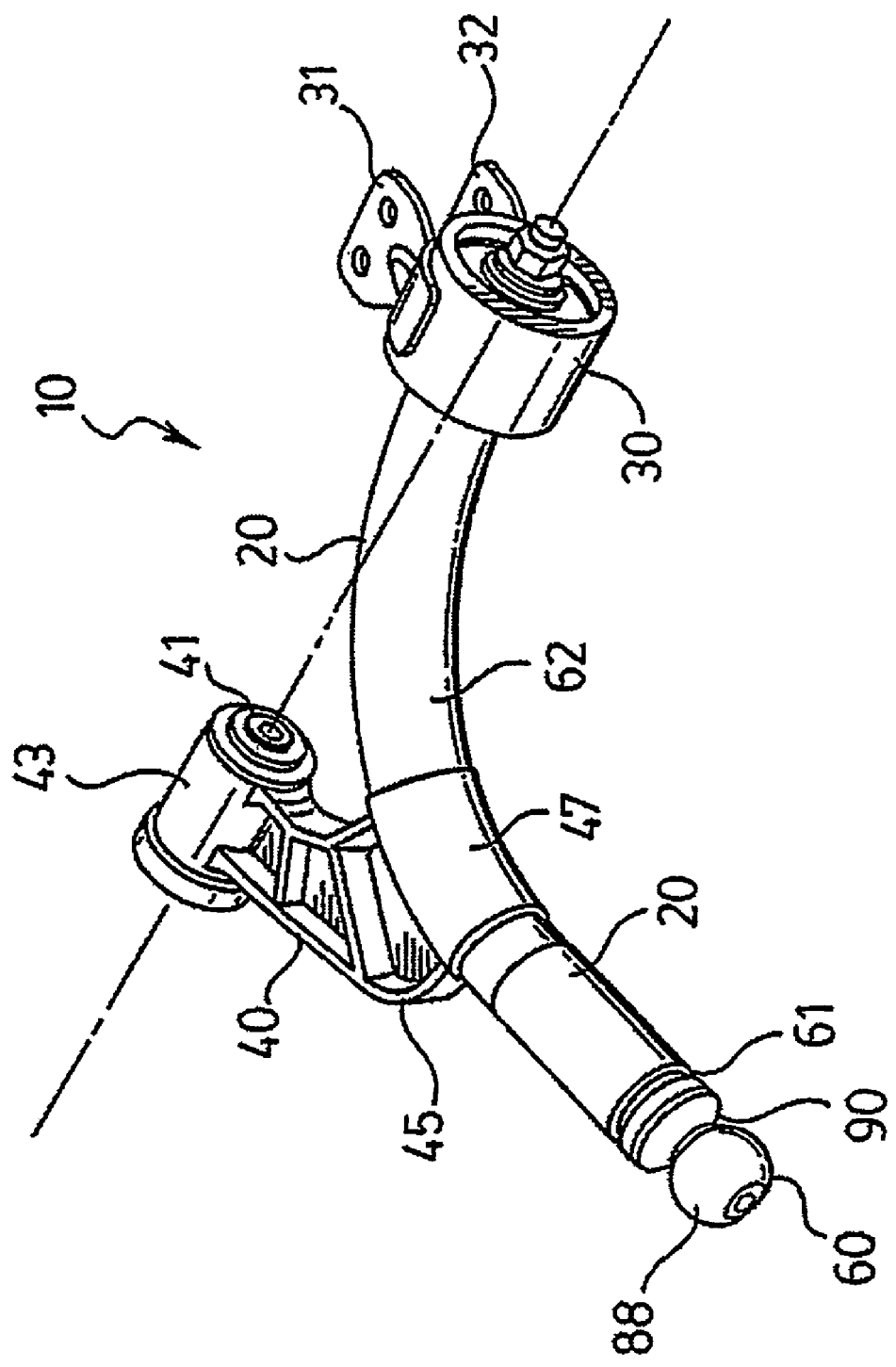
FIG. 5 illustrates a perspective, isolated view of a control arm assembly of FIG. 1.

The outer bearing 54 may have an outer surface 80 that conforms to the side 72 of socket 51 and a concave inner surface 82 that is substantially the same shape and configuration as the portion of end fitting 60 that it contacts. The outer bearing 54 may also have a flange 84 that is pressed against the outer perimeter of socket 51. As best seen in FIG. 5, the outer bearing may be formed in two, semi-circular pieces, 54a and 54b that may be positioned into socket 51 after end fitting 60 has been inserted into socket 51. Together the two pieces 54a and 54b would form a circular bearing structure that would contact portions of the end fitting 60 that are adjacent to neck 90. The two pieces 54a and 54b may mechanically or adhesively connect or interlock with each other once inserted into the socket 51. Once assembled, the bearings 53 and 54 form a circular bearing structure that encompasses end fitting 60 around most of its outer surface 88 except the area directly adjacent to the neck 90 of the control arm 20. Thus, the shape of bearing 44 complements the shape of the end fitting 60 and forms a connection between the socket 51 and the end fitting 60 with a high efficiency of space.

Bearing members 53 and 54 may be formed of any appropriate bearing material. For example, bearing members 53 and 54 may be molded of polymer materials such NYLON or fluorocarbon polymers like TEFLON.

While the bearing 53 has been shown as being inserted first into the socket 51 and prior to the insertion of the end fitting 60, other configurations and methods are possible. For example, both bearings 53 and 54 may be formed on the end fitting 60 and then the end fitting 60 together with bearing 53 and 43 may be inserted into the socket 51 so that the end result looks substantially as shown in the figures. In such a configuration bearing 54 may be a one-piece, unitary configuration. Also, only one of bearings 53 and 54 may be formed on the end fitting 60 and the one bearing would then inserted into socket 51 when the end fitting 60 is inserted.

The illustrated embodiment of FIGS. 1-5 also includes a tubular flexible seal 52 that extends between the steering knuckle 50 and the main portion 62 of the control arm 20 to keep and debris away from the ball-and-socket joint 58. Thus, the seal 52 helps keep the connection between the end fitting 60 and the bearings 53 and 54 as free as possible from unwanted particles that could hamper the free movement of the end fitting 60 within the socket and/or deteriorate the rotary ball-and-socket joint 58.

Seal 52 extends around control arm 20 and has a generally tubular cross-section. At one end, seal 52 has flange 52a extending into an annular recess 61 in the control arm 20 to secure the seal 52 to the control arm 20. The other end of the seal 52 tightly abuts the surface of the steering knuckle 50, adjacent the flange 84 of the outer bearing 54. Adhesives may also be used to secure seal 52 to steering knuckle 50 and control arm 20. The seal 52 may be attached between the control arm 20 and the steering knuckle 50 in other manners, such as those that are generally known for attaching such seals. The seal 52 may be attached to the control arm 20 after the ball-and-socket joint 58 is formed.

Although the embodiment of FIGS. 1-5 illustrates that the end fitting 60 is attached to control arm 20 while the complementary socket 51 for the socket portion of the ball-and-socket joint 58 is within the steering knuckle 50, this situation may be reversed. That is, the socket portion of the ball-andsocket joint 58 may be formed in the control arm 20 while the ball portion of the ball-and-socket joint 58 may be formed on the steering knuckle 50.

Figure 6:
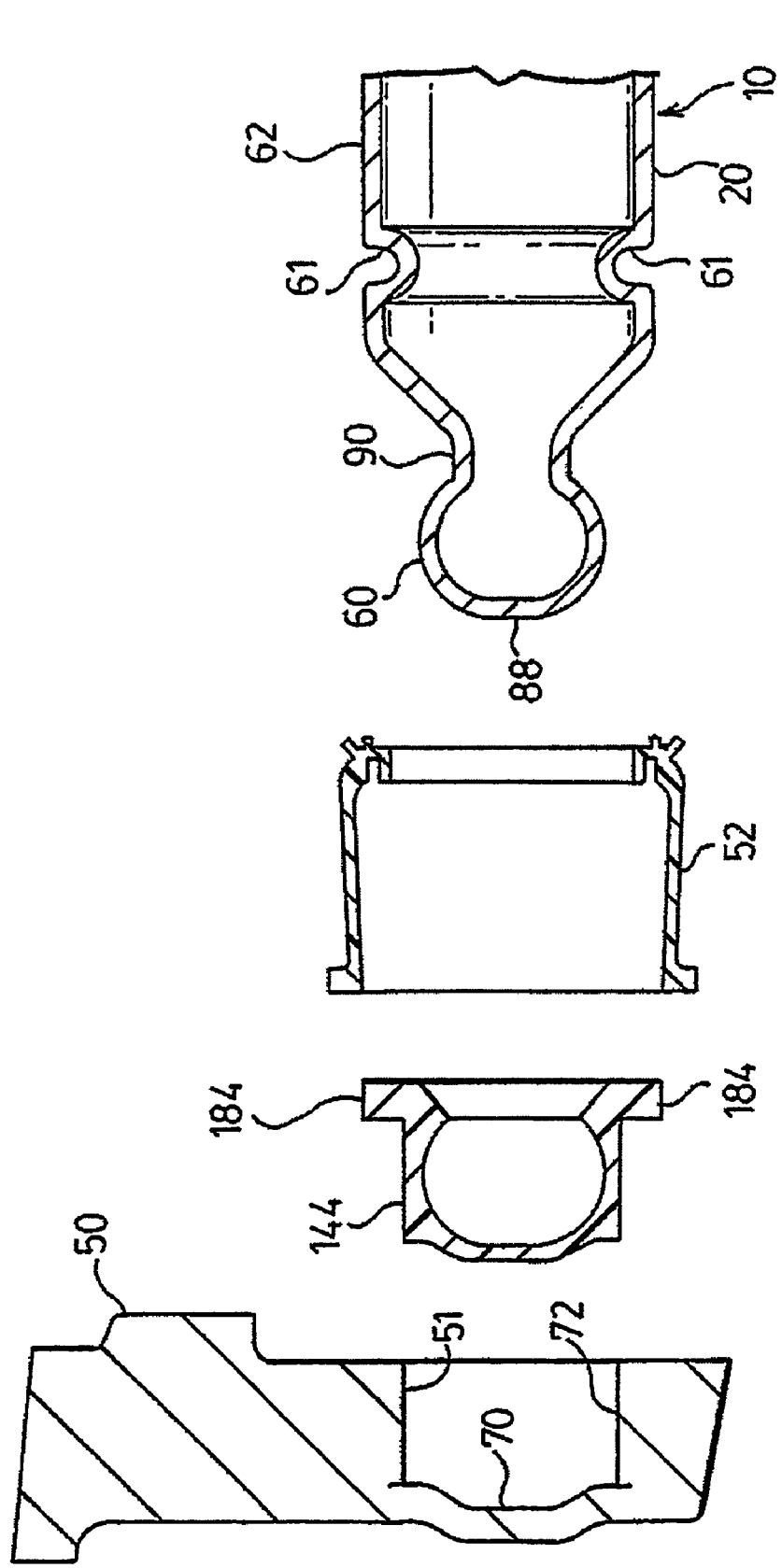
FIG. 6 illustrates an exploded, cross-sectional view of another embodiment of the present invention.

FIG. 6 illustrates another embodiment of a rotary ball-and-socket joint 158. A single bearing 144 is employed in place of the multi-piece bearing assembly using bearings 53 and 54. Once installed in socket 51 and around end fitting 60, the shape and configuration of bearing 144 would be substantially identical to that of bearings 53 and 54. However, since bearing 144 is integrally formed as a one-piece, unitary element the entire bearing 144 may be secured into the socket 51 in a single operation. Then, the end fitting 60 may be forced into the bearing 144 and into position within the socket 51 to a position as substantially illustrated as a final assembly in FIG. 4. Of course, the outer end of the bearing 144, especially the bearing flange 184 and the adjacent area of bearing 144 will be sufficiently resilient to deform and permit the end fitting 60 to ingress into bearing 144 and into socket 51 while returning to an original position to lock the end fitting 60 within the socket 51.

Bearing 144 may be formed of the same material as above with respect to bearings 53 and 54 and bearing 144 may be substantially identical to bearing 44 except for the two-piece configuration of bearing 44. Further, other arrangements with bearing 144 are possible including initially forming the bearing 144 on end fitting 60 and inserting the end fitting 60 along with the bearing 144 simultaneously into socket 51 while the bearing 144 is secured in socket 51.

Referring to FIG. 7, an alternate embodiment for forming a flexible joint between the steering element and control arm is illustrated. Rather than rotary swaging an end fitting 60 on the end of the tube, tube 20' has an internal thread that receives a main portion 130. Portion 130 has a threaded portion 132 that threadingly engages with the tube 20' and screw portion 134. Screw portion 134 threadingly receives end fitting 60' or other steering element to control arm end fitting, well known in the art. Housing 130 has an annular groove 61' configured for receiving boot 52.

This embodiment has the advantage that if the end fitting is damaged or worn, the end fitting can be replaced or repaired rather than replacing the entire control arm.

Figure 8:
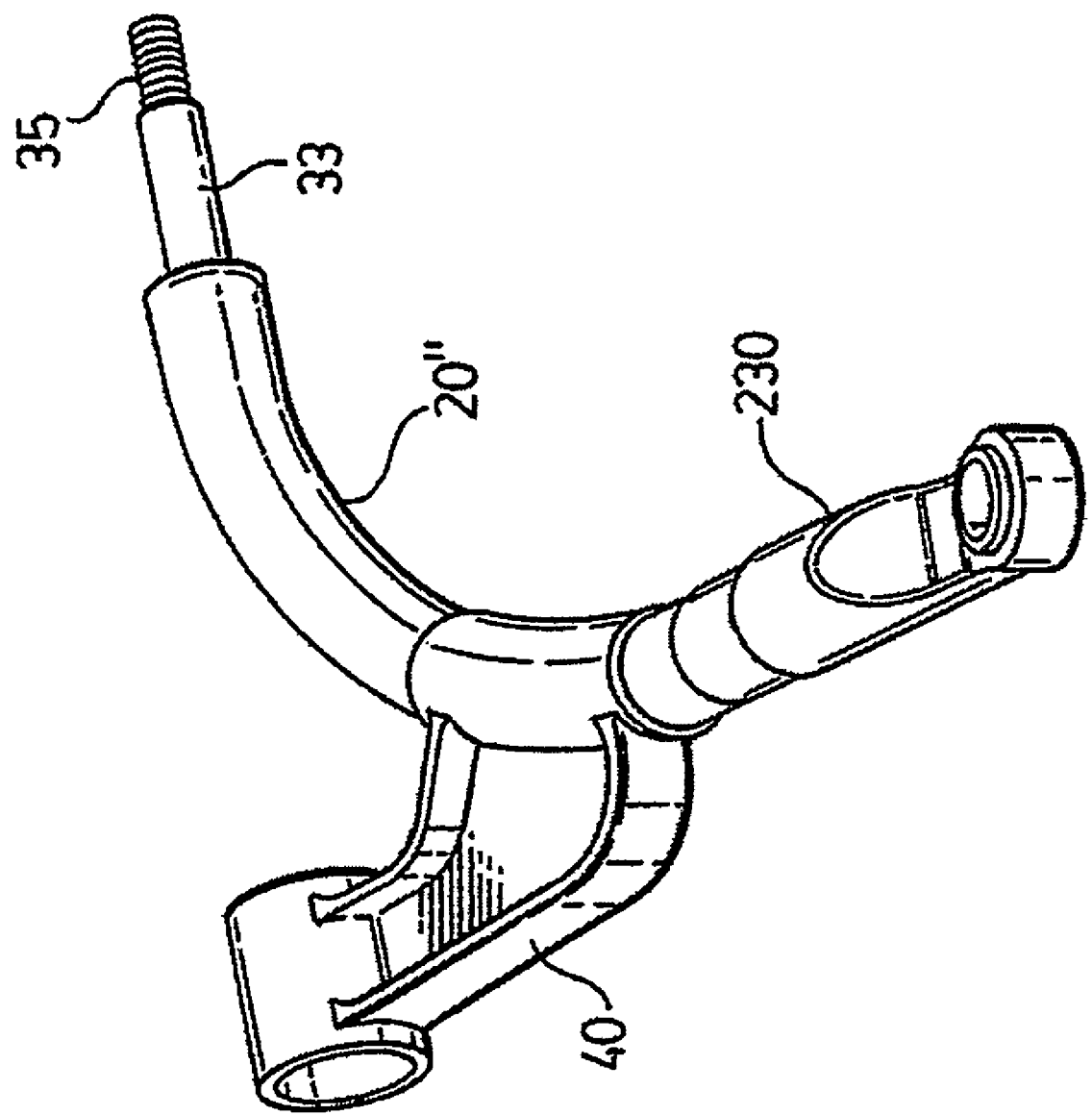
FIG. 8 illustrates a perspective view of another alternate embodiment of the control arm of the present invention.

Referring to FIG. 8, an alternate embodiment of the control arm 20" is illustrated. The control arm 20" has a first reduced diameter portion 33 and a second reduced diameter portion 35 and a cast second node 40, similar to the embodiment of FIGS. 1-5. A different form of end fitting 230 is provided on the distal end of the control 20". End fitting 230 may be cast directly on the end of the tube 20" or alternately threaded onto the end of the tube 20"

Figure 9:
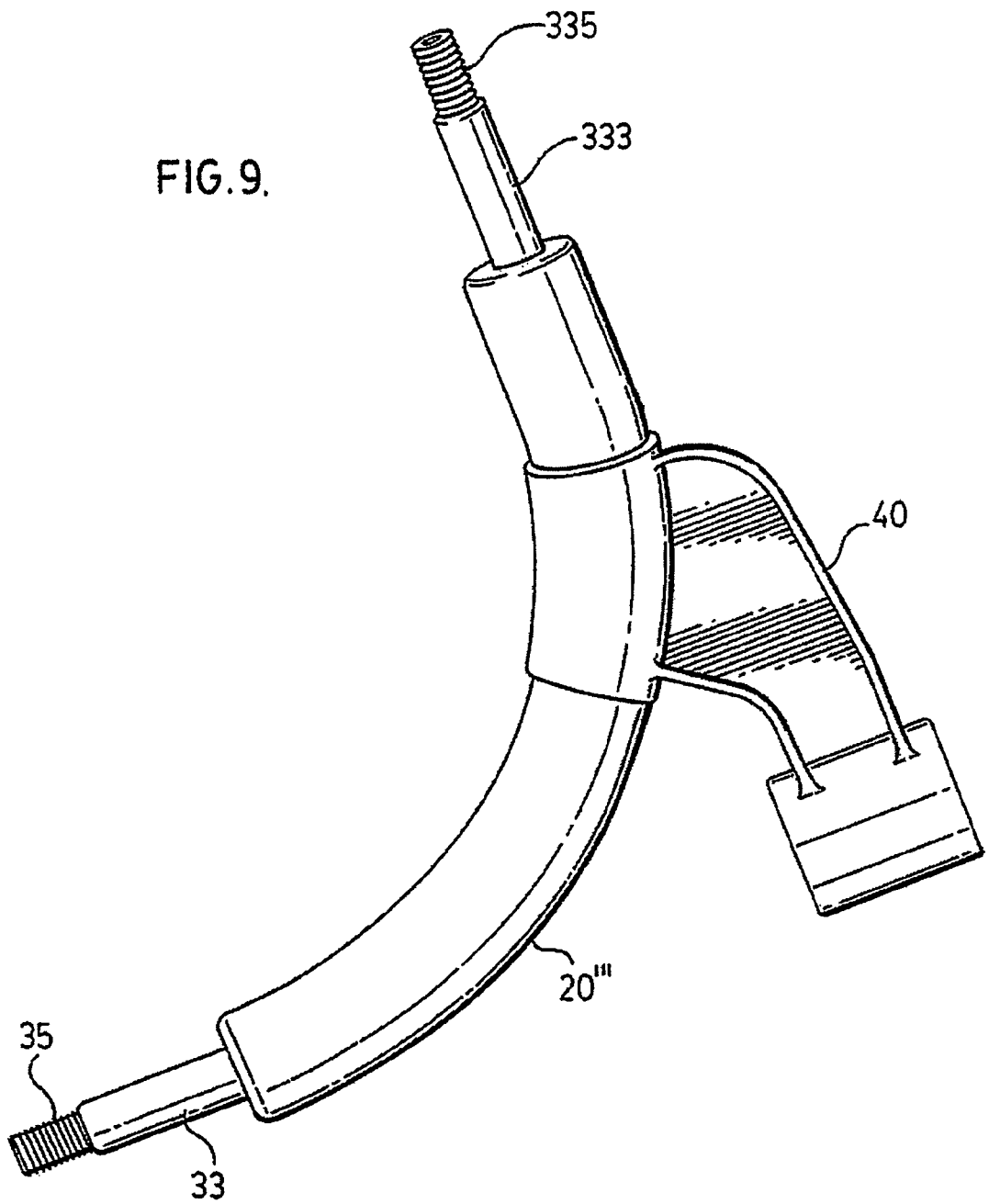
FIG. 9 illustrates a perspective view of another alternate embodiment of the control arm of the present invention.

Referring to FIG. 9, an alternate embodiment of the control arm 20''' is illustrated. The control arm 20''' has a first reduced diameter portion 33 and a second reduced diameter portion 35 and a cast second node 40, similar to the embodiment of FIGS. 1-5. Control arm 20''' has a different form of end fitting comprising a first reduced portion 333 and a second reduced diameter portion 335, providing a bayonette style mount on both ends of control arm 20'''.

The preferred order of manufacture is that a straight tube is swaged and machined to form a workpiece. The workpiece is then bent to the desired arc. The arcuate workpiece is then placed in a mold and the node 40 is then cast directly onto the workpiece to form control arms 20, 20', 20", and 20'''.

The proposed control arms 20, 20', 20", and 20''' require less space and less material and achieve improved dimensional tolerances for vehicle wheel suspension systems. As a result, the illustrated embodiments of the subject application result in a knuckle/control arm interface that requires less space, less weight, less cost, fewer parts, and improved dimensional tolerance of the assembly relative to previous knuckle/control arm joints.

The foregoing specific embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. A control arm assembly comprising a tubular steel body having a first end arcuately extending to a second end, said first end having a first node configured for mounting said first end for rotation about a first axis, said second end having an end fitting, said body having a second node affixed thereto intermediate said first end and said second end, said second node defining a second axis of rotation coincident with said first axis.

2. A control arm assembly according to claim 1, wherein said first end has a first portion and a threaded second portion, said first portion receiving a bushing assembly and said threaded portion receiving a fastener for retaining said bushing assembly on said first end.

3. A control arm assembly according to claim 2, wherein said first portion has a diameter less than a diameter of said body, and said threaded portion has a diameter less than said diameter of said first portion.

4. A control arm assembly according to claim 3, wherein said second node is a cast material.

5. A control arm assembly according to claim 4, wherein said tubular steel body is a high strength spring steel.

6. A control arm assembly according to claim 5, wherein said spring steel has a yield strength of at least 760 MPa.

7. A control arm assembly according to claim 6, wherein said cast material is aluminum.

8. A control arm assembly according to claim 7, wherein said end fitting is configured for a rotary connection to a steering element.

9. A control arm assembly according to claim 8, wherein said end fitting is a ball.

10. A control arm assembly according to claim 9, wherein said ball is integrally formed on said body.

11. A control arm assembly according to claim 9, wherein said ball threadingly engages said body.

12. A control arm assembly according to claim 1, in combination with a steering element, said steering element having a complementary fitting for engaging said end fitting of said control arm to form a flexible joint therebetween.

13. A combination according to claim 12, wherein said end fitting is a ball.

14. A combination comprising a control arm assembly and a steering element, said control arm assembly including a tubular steel body having a first end arcuately extending to a second end, said first end having a first node configured for mounting said first end for rotation about a first axis, said second end having an end fitting, said body having a second node affixed thereto intermediate said first end and said second end, said second node configured for mounting said control arm for rotation about said first axis, wherein said end fitting is a ball, said steering element having a complementary fitting for engaging said ball to form a flexible joint therebetween, said combination further comprising a bearing having an inner configuration that is complementary to the ball for receiving said ball, and an outer configuration complementary to said complementary fitting to be received therein.

15. A combination according to claim 14, wherein said bearing is molded from a fluorocarbon polymer or nylon.

16. A combination according to claim 15, wherein said bearing is a multi-piece bearing.

17. A combination according to claim 15, further comprising a seal extending from said steering element to said control arm.

18. A combination according to claim 17, wherein said complementary fitting is a socket.

19. A combination according to claim 18, wherein said ball is integrally formed on said body of said control arm.

20. A combination according to claim 18, wherein said ball threadingly engages said body of said control arm.

21. A combination according to claim 20, wherein said steering element is a steering knuckle.

22. A control arm assembly comprising a tubular steel body having a first end arcuately extending to a second end, said first end having a first node configured for mounting said first end for rotation about a first axis, said second end being shaped as a ball, wherein said ball and said body are integrally formed as one piece, said body having a second node affixed thereto intermediate said first end and said second end, said second node configured for mounting said control arm for rotation about said first axis.

23. A control arm assembly according to claim 22, wherein said first end has a first portion and a threaded second portion, said first portion receiving a bushing assembly and said threaded portion receiving a fastener for retaining said bushing assembly on said first end.

24. A control arm assembly according to claim 22, wherein said ball includes an uninterrupted closed wall.

* * * * *